(12) United States Patent
Kirsch

(10) Patent No.: US 7,783,597 B2
(45) Date of Patent: Aug. 24, 2010

(54) EMAIL FILTERING USING RECIPIENT REPUTATION

(75) Inventor: Steven T. Kirsch, Los Altos Hills, CA (US)

(73) Assignee: Abaca Technology Corporation, San Jose, CA (US)

( * ) Notice: Subject to any disclaimer, the term of this patent is extended or adjusted under 35 U.S.C. 154(b) by 331 days.

(21) Appl. No.: 11/951,110

(22) Filed: Dec. 5, 2007

(65) Prior Publication Data

US 2009/0037469 A1 Feb. 5, 2009

Related U.S. Application Data

(60) Provisional application No. 60/953,627, filed on Aug. 2, 2007.

(51) Int. Cl.
  *G06F 7/00* (2006.01)
(52) U.S. Cl. .................................. 707/609; 709/206
(58) Field of Classification Search ......... 707/609–620, 707/748–754; 709/206–211
  See application file for complete search history.

(56) References Cited

U.S. PATENT DOCUMENTS 7,206,814 B2  4/2007 Kirsch
2003/0233418 A1  12/2003 Goldman
2005/0015626 A1*  1/2005 Chasin ..................... 713/201
2005/0080856 A1*  4/2005 Kirsch ..................... 709/206
2006/0036693 A1*  2/2006 Hulten et al. ............. 709/206
2006/0095524 A1*  5/2006 Kay et al. ................. 709/206
2006/0184500 A1*  8/2006 Najork et al. ................ 707/1
2007/0185960 A1*  8/2007 Leiba et al. .............. 709/206
2008/0175226 A1*  7/2008 Alperovitch et al. ...... 370/352
2008/0301040 A1*  12/2008 Knudson et al. ............. 705/39

* cited by examiner

*Primary Examiner*—Wilson Lee
(74) *Attorney, Agent, or Firm*—Schneck & Schneck; Thomas Schneck

(57) ABSTRACT

The present invention is an adaptive method for filtering spam by using the reputations associated with recipients of email messages to determine the reputations of message and content attributes, then using the attribute reputations to determine whether or not the email message is spam and then using the determination of spam to update the reputations associated with the recipients of the email message. The present invention can also be used in conjunction with existing spam algorithms. Optionally, training of existing spam algorithms may be implemented by the use of recipient reputations or training types derived from recipient reputations.

7 Claims, 3 Drawing Sheets

EMAIL FILTERING USING RECIPIENT REPUTATION

CROSS-REFERENCE TO RELATED APPLICATION

This application claims priority from U.S. provisional application No. 60/953,627, filed Aug. 2, 2007.

TECHNICAL FIELD

The present invention relates to filtering unwanted email messages known as spam.

BACKGROUND ART

Email spam, also known as bulk or junk email, usually involves sending nearly identical unsolicited email messages to numerous recipients by email. It has been estimated to cost US businesses over a billion dollars per year. Since the cost for sending spam to large amounts of recipients is small, spammers have no incentive to limit their mailings either by size or to people who might be interested in receiving the email message. It is the recipient who bears the costs of this junk mail. There have been some estimates that 80-85% of incoming email messages are spam.

Spammers go to great lengths to remain undetected. They constantly change the very things traditional spam filtering systems look at to determine whether an email message is spam. They change their sender name, IP address, network address etc. They can set up temporary and disposable accounts at numerous Internet service providers. Once an account has become old or stale or detected, they quickly move to a new account from which to send email messages, thereby changing the sender, IP address and network associated with the email message. They pretend to originate an email message from any email address by spoofing either the email address or the IP address. They can forge delivery headers so the email message seems to come from a legitimate email server and network. They can take over networks of infected PCs creating zombies or botnets to send out email messages so they and their IP address are no longer sending the email message. They can disguise the email message content by misspelling words that would be easily detectable by a program yet still understandable by a human being.

There are currently at least seven different approaches to filtering spam: IP blacklists (e.g., RBLs), rules based (e.g., SpamAssassin), Bayesian (e.g., Netscape, PopFile), reputation (e.g., Ironport), Decoy (e.g., Symantec), collaborative checksum (e.g., Hotmail, Cloudmark) and a cocktail combination of some or all of the above (e.g., Ciphertrust).

Most existing email message anti-spam filtering systems focus on the sender or the content of the incoming email message. These systems use spam algorithms to calculate a message score for an email message and the message score is then used to determine whether the email message is ham or spam. The algorithms are trained either by one of two methods. They can be trained with a training set of email messages which are pre-categorized by a human or some other system. They can be self-trained once they have been bootstrapped, i.e., they feedback their own message score and ham or spam determination for training. This feedback is then used to update the list of senders and various message attributes such as the reputation of URLs in the email message and can cause positive feedback errors. These systems are not very accurate.

The best systems seldom achieve better than 98% effectiveness at filtering out spam. Some rely on user input to classify spam and some require extensive training to be accurate. These systems cannot get much better because they focus on the sender or the content of the email message. Criteria checked by these systems when monitoring incoming email messages are the very things which the spammers are changing, hiding and constantly trying to defeat.

For example, a spammer sends out exactly 1,000 email messages in so-called micro spams. The spammer ensures that the content passes filtering programs such as SpamAssassin by sending from a fresh IP address to a relatively clean list of real users. This email message passes all the systems.

Consider another example where a legitimate company sends email messages from their email system. In this hypothetical example, assume an email message from a reputable company is sent out using their domain name. The sending IP address is not in any blacklist. The content is clean and does not violate any SpamAssassin rules. This company does two mailings at the same time, both with identical content and both from the same IP address. The first is to one million people who registered on the company's website. The second is to a list of one million people that someone bought from a spammer which has been cleansed of any email addresses on a decoy database. This means they are all real, actual users. The company sends out the email messages from multiple IP addresses so that the entire two million piece mailing takes place in less than one minute. Typically, none of the filtering systems will catch the email messages sent with the second spam mailing. That is because the only difference between the two mailings is the recipient list that was used. None of the filtering systems takes that into account.

A Bayesian system uses recipient reputations for email filtering to a small extent. With Bayesian systems, message token reputations are established from training email messages, as either spam or ham (good email messages that are wanted or solicited by the recipient). Recipients are treated like any other token in the email message used to determine a score for the email message. A combination of scores of all the tokens are used. Bayesian systems typically are "per user" systems. The filter for a specific user's email messages will only encounter recipients of email messages that are also sent to that specific user. What is needed is a more reliable email filtering system.

SUMMARY OF THE INVENTION

To resolve shortcomings for identifying spam, the present invention uses an adaptive method entirely based on statistics derived from recipient email. The present invention while taking rules into account is neither limited nor restricted by them. While spam is usually defined by the relationship between the sender and the recipient, it is more productive and accurate to use the statistics of each recipient to make the determination whether or not an incoming email message is spam. None of the current systems focus entirely on the recipients, who cannot be changed, modified or hidden by the spammers. It is the recipients that define what is and is not spam. Recipient statistics can rate an email message as spam the moment it is received. This rating can often be done without looking at the content of the email message, without any human involvement and with far greater precision than any single human being or any rules based system. In a first embodiment, the present invention uses recipient reputations of unsolicited email messages to update the ham and spam statistics of message and content attributes, which in turn determines a message score, which in turn determines whether the incoming email message is spam, which in turn updates the recipient reputations. This paradigm shift, of using and updating the recipient reputations in the described loop, is different from the usual, "message attributes determines score which in turn updates the message attributes", self-training loop of traditional spam filters. In the first embodiment, the message attribute statistics are updated from the recipient statistics rather than from the message score so there is one extra level of indirection in the current invention. In the prior art the message score determines the message attributes where in the first embodiment the message score determines the recipient reputation which then determines the message attributes.

An email message basically has two parts, a header and a body where both of these parts have content. There can also be files attached to the email message. The header contains information in fields which identify such things as recipients, sender, IP addresses, network addresses, subject of the email message, date and time of the email message, etc, that are associated with the email message. The body contains text which comprises information being conveyed to the recipient of the email message. The body and text of the email message are examined and pertinent information is recorded.

The first embodiment maintains and updates a historical database of recipient reputations, which are based on the ham and spam counts of unsolicited email messages received by the recipients, message and content attribute reputations which are derived from the recipient reputations and various other statistics used to make the calculations and determinations necessary in the method. The historical database is kept as a central statistics database. Unsolicited email messages are defined as email messages where the receiver has never seen an email message from that sender before. Ham is considered as good or wanted email messages and spam is considered as bad or unwanted email messages. Message attribute reputations are sender reputation, IP reputation and network reputation. Content attribute reputations are individual reputations for each of the various content elements of the content of an email message. These content elements are URLs, domain names, body text hashes, subject lines, words, phrases, call to action items like a mailto:, and so on.

There are three general categories of recipients. These categories are an individual recipient of the email message, the name of a mailing list if the email message was sent to a mailing list and a generic recipient which is taken to be a recipient that has received all email messages. Feedback from previous ratings is not used to influence the reputations of the message and content attributes directly. The reputations of recipients of the email message are used to determine the message and content attribute reputations and hence whether the email message is spam.

Sender reputation is not based on a sender's past history as in existing systems. For example, it is not based on the number of ham and spam email messages sent by a sender. It is instead based on combining the reputations of each unique unsolicited recipient of the email message sent by that sender. If a sender has sent two good ham email messages and ten bad spam email messages, existing systems give the sender a reputation based on the ratio of the good to bad email messages as 2/10, indicating he is a spammer. Based on this, an incoming email message from this sender is rated as spam. Only the reputations of the unique unsolicited recipients normalized by the generic recipient reputation are used to calculate the sender reputation. These normalized recipient reputations are called likelihood ratios. If a number of email messages are sent only to two unique recipients and one recipient reputation has a normalized reputation of unsolicited email messages of 2/1 and the second recipient reputation has a normalized reputation of unsolicited email messages of 3/2, the first embodiment does not rate the sender as a spammer. Assuming that the email message is unsolicited for both recipients, the two normalized recipient reputations are multiplied together to give the sender a ham to spam reputation of 6/2 indicating the sender is a good sender and not a spammer so the email message is good. The first embodiment ignores how many email messages the sender sends to the recipients.

IP reputation is not based on the number of good and bad email messages coming from the IP address as done in existing systems. It is based on the number of unique good senders and unique bad senders (using the method described in the previous paragraph) using this IP address to send email messages and is updated each time an unsolicited email message is received. Take the above example where the sender is the only sender using this IP address having sent two good email messages and ten bad email messages. Most existing systems would rate the number of good and bad email messages coming from this IP address as 2/10 and would rate this IP address as bad. The first embodiment gives a different result. There is only one sender using this IP address and this sender has been rated as good. Since there is only one sender using this IP address who has been rated as good, there are no bad senders from this IP address. The ratio for the IP reputation of unique good senders to unique bad senders, is 1/0 indicating that this is a good IP address.

Network reputation is associated with a broad range of IP addresses that are grouped together. This could be a netblock, IP addresses with the same reverse domain name, etc. Since spammers use IP address ranges that are often misconfigured, the preferred definition for "the network of an IP address" is the first 24 bits of the IP address. The network reputation is not based on the number of good and bad email messages coming from the network as done in existing systems. It is based on the number of unique good IP addresses and unique bad IP addresses (using the method described in the previous paragraph) within this network IP address range and is updated each time an unsolicited email message is received. It is calculated similarly to the method used above for IP addresses. If the IP reputation of the IP address of the current email message has had a state change the network reputation changes accordingly. State change means a reputation change from good to bad, bad to good, unknown to good, unknown to bad or classification of a new IP address based on the calculation of the sender reputation. Network reputation changes accordingly.

Content attribute reputations are not based on the number of good and bad email messages containing this content attribute. Content attribute reputations are based on the number of unsolicited email messages received by good and bad recipients containing these content attributes. They are updated when the IP reputation for an unsolicited email message is uncertain. Uncertainty could comprise the IP reputation not being clearly good or bad or not yet established for a new IP address. Content attribute reputations are stored for each content element found in the email message. Recall that content elements are URLs, domain names, body text hashes, subject lines, words, phrases, call to action items like a mailto:, and so on. Normalized content attribute reputations are used in the calculations and no more than two are used. The content attribute reputations used are for the content attributes with the best good normalized value and the worst bad normalized value. The best good content attribute reputation has the highest normalized ham to spam numeric value that is greater than one (1). The worst bad content attribute reputation has the lowest normalized ham to spam numeric value that is less than one (1). The reputations for the individual content attributes are ratios of the number of unsolicited email messages sent to good recipients (those who receive mostly ham email messages) and to bad recipients (those who received mostly spam email messages). Those ratios are normalized by the reputation of a generic content attribute. The generic content attribute is a content attribute taken to be present in all email messages, e.g., "space" character.

Message scores are calculated from updated message and content attribute reputations using a hierarchal method that determines which reputations are included in the calculation. The hierarchal order for determining the message score is sender reputation, IP reputation, network reputation and content attribute reputations. The message and content attribute reputations are tested in the above mentioned order until a first attribute reputation is found with a sufficiently high confidence level meaning it is statistically significant. Confidence levels can be based on the number of samples used to determine the reputation or the numerical value of the reputation. For example, a confidence level might be "for at least 10 samples" or "has a reputation greater than 5/1." The first attribute reputation with such a high confidence level determines which attribute reputations are used to calculate the message score. The important concept is that the message and content attribute reputations which are used to determine the message score are all derived from ham and spam statistics of the recipients of the email message.

The first reputation to be tested is the sender reputation. If the sender reputation has a high enough confidence level the message score calculation uses just the sender reputation. When the sender reputation has too low a confidence level, the IP reputation is tested.

If the IP reputation has a high enough confidence level the message score calculation uses the sender and IP reputations. When both sender IP reputations have confidence levels that are too low, the network reputation is tested. If the network reputation has a high enough confidence level the message score calculation uses the sender, IP and network reputations.

When none of these three reputations (sender, IP and network) have a sufficiently high confidence level, the message score calculation uses all four the reputations, sender, IP network and content reputations. The content reputation part of the calculation includes the best good normalized content attribute reputation and the worst bad normalized content attribute reputation, respectively the highest and lowest values of the normalized reputations for the content attributes of the email message.

A determination, based upon the message score, is then made whether the email message is spam. The email message is then processed accordingly by the email system which received the email message.

The recipient and generic recipient reputations are then updated by the determination of whether the email message is spam.

In another embodiment, the present invention uses recipient reputations to determine statistics which are sent to any kind of existing spam algorithm. The existing spam algorithm uses these recipient derived statistics for training. The trained existing spam algorithm then determines whether the email message is ham or spam. The email system which received the email message is notified of the ham or spam determination so it can take appropriate action. The recipient reputations for each recipient of the email message and the generic recipient are updated based on the ham or spam determination of the email message. Positive feedback errors, which are inherent in self-training algorithms, are avoided by using statistics derived from recipient reputations for training.

The recipient reputations can be based on statistics of either unsolicited email messages, solicited email messages or both unsolicited and solicited email messages. The statistics for unsolicited and solicited email messages are kept separately from each other in the historical database. In the case of unsolicited statistics, data in the historical database is kept separate for each recipient. In the case of solicited statistics the data in the historical database is kept separate for each unique recipient-sender combination. For example, a recipient who receives email messages from ten unique solicited senders and 100 unique unsolicited senders has 11 separate sets of statistics that can be used to determine the recipient reputation: one set for all the unsolicited senders and ten sets, one for each of the unique solicited senders. Recipient reputations based on unsolicited statistics are normalized by the inverse of the generic recipient reputation. Recipient reputations based on solicited statistics are not normalized.

As in the first embodiment there are three general categories of recipients. These categories are an individual recipient of the email message, the name of a mailing list if the email message was sent to a mailing list and a generic recipient which is taken to be a recipient that has received all email messages. There is a historical database, which as in the first embodiment is kept as a central statistics database, storing ham and spam counts of email messages received by recipients. These ham and spam counts are kept for both solicited and unsolicited email messages where the statistics for solicited email messages are kept separate for unique recipient-sender combinations. The determination by the existing spam algorithm of whether the email message is spam is sent to the email system and recipient reputations are updated and stored in the historical database based on the ham or spam determination of the email message.

The recipient reputations can be based on either unsolicited, solicited, or both unsolicited and solicited statistics of email messages. If unsolicited statistics are required then the recipient reputations are normalized by multiplying them by the inverse of the generic recipient reputation. If solicited statistics are required the recipient reputations for the appropriate unique recipient-sender combinations are used directly without any normalization. The recipient reputations are sent to the existing spam algorithm which determines whether the email message is ham or spam. The email system is notified of the ham or spam determination of the email message and takes appropriate action. The recipient reputations of the recipients of the email message and the generic recipient reputation are updated accordingly and stored in the historical database.

DETAILED DESCRIPTION

Definitions

Figure 1A:
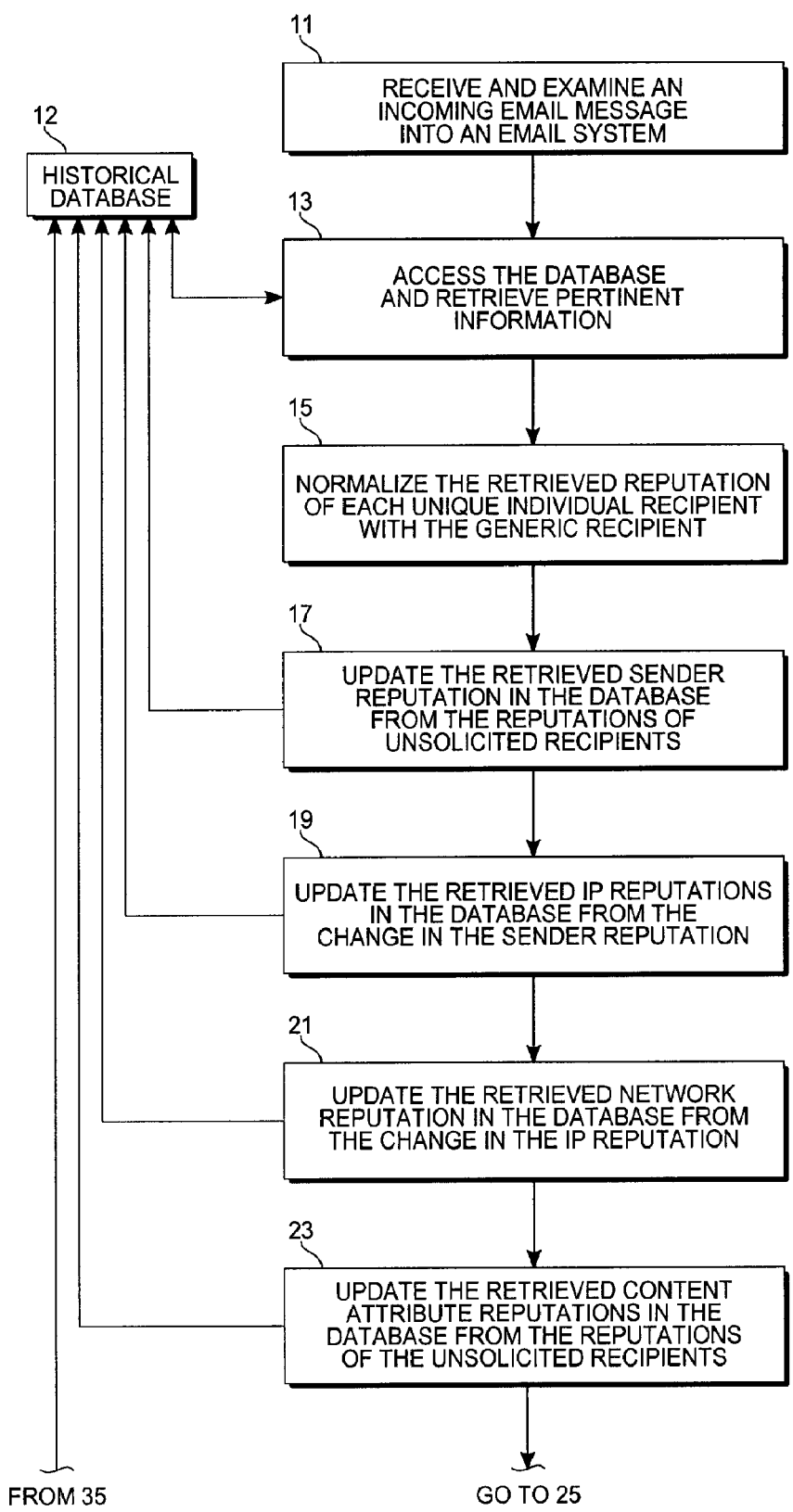
FIGS. 1A and 1B are flow charts of a first embodiment of an email filtering method in accordance with the present invention.

Unsolicited is defined as the first time a recipient has received an email message from a sender.

Ham is defined as an email message that a recipient wants to receive.

Spam is defined as an unsolicited email message that a recipient does not want to receive.

Good is defined as pertaining to a preponderance of ham.

Bad is defined as pertaining to a preponderance of spam.

Recipient is defined as either an individual recipient of an email message or the name of a mailing list if the email message was sent to a mailing list.

Recipient reputation, based on unsolicited statistics, is preferably defined as a ratio of ham to spam unsolicited email messages sent to a recipient. It is one ratio for unsolicited email messages received by a recipient from all senders. It could also be defined as a ratio of unique good to bad IP addresses that have sent unsolicited email messages to this recipient or a ratio of unique good to bad senders sending unsolicited email messages to this recipient.

Recipient reputation, based on solicited statistics, is defined as a ratio of ham to spam solicited email messages sent to a recipient by a sender. There can be numerous solicited recipient reputations for one recipient. There is one solicited recipient reputation for each unique recipient-sender combination.

Generic recipient is defined as an assumed recipient for every unsolicited email message coming into an email system.

Generic recipient reputation, the reputation of the generic recipient, is based on unsolicited statistics. It is preferably defined as a ratio of ham to spam unsolicited email messages sent to an email system. It is one ratio for unsolicited email messages received by an email system from all senders. It could also be defined as a ratio of unique good to bad IP addresses that have sent unsolicited email messages to this email system or a ratio of unique good to bad senders sending unsolicited email messages to this email system. The generic recipient reputation is used to normalize recipient reputations.

Good recipients of unsolicited email messages are recipients who get more ham than spam compared to the generic recipient.

Bad recipients of unsolicited email messages are recipients who get more spam than ham compared to the generic recipient.

Good recipients of solicited email messages are recipients who get more ham than spam solicited email messages.

Bad recipients of solicited email messages are recipients who get more spam than ham solicited email messages.

Sender is defined as the senders address, such as, sender@service_provider.com. In order to be immune to fraud, it may also include the domain name of the IP address sending the mail, e.g., sender@service_provider.com@service_provider.com.

Sender reputation is preferably defined as multiplying the normalized reputations of each unique unsolicited recipient of the email message sent by the sender. It can also be defined by taking the ratio of good to bad recipients of the email message. Both of these definitions for the sender reputation can be modified by incorporating explicit whitelisting and blacklisting of the sender by recipients.

IP address is defined as the address from which a sender sends an email message.

IP reputation is defined as a ratio of the number of unique good to bad senders using this IP address to send unsolicited email messages.

Network is defined as a range of IP addresses, whose first twenty four (24) bytes are the same.

Network reputation is defined as a ratio of the number of unique good to bad IP addresses within this network sending unsolicited email messages Content attributes are defined as individual content elements comprising the email message such as URLs, body text hashes, words, subject lines, phrases, and so on.

Content attribute reputation is preferably defined as a ratio of the number of good to bad recipients receiving this content attribute in email messages when both (a) the email messages are unsolicited by those recipients and (b) the IP address reputation is indeterminate (not a pure source of ham or spam) or not yet determined. There can be numerous content attribute reputations for an email message, one content attribute reputation per individual content attribute.

Generic content attribute is defined as a content attribute assumed to be present in every email message.

Generic content attribute reputation is preferably defined as a ratio of the number of good to bad recipients receiving this generic content attribute which is assumed to be present in all email messages when both (a) the email messages are unsolicited by those recipients and (b) the IP address reputation is indeterminate (not a pure source of ham or spam) or not yet determined. The generic content attribute reputation is used to normalize content attribute reputations to the "average" content element.

Existing spam algorithm is a set of rules already present and not part of the present invention that is determining whether an email message is spam.

Description

Figure 1B:
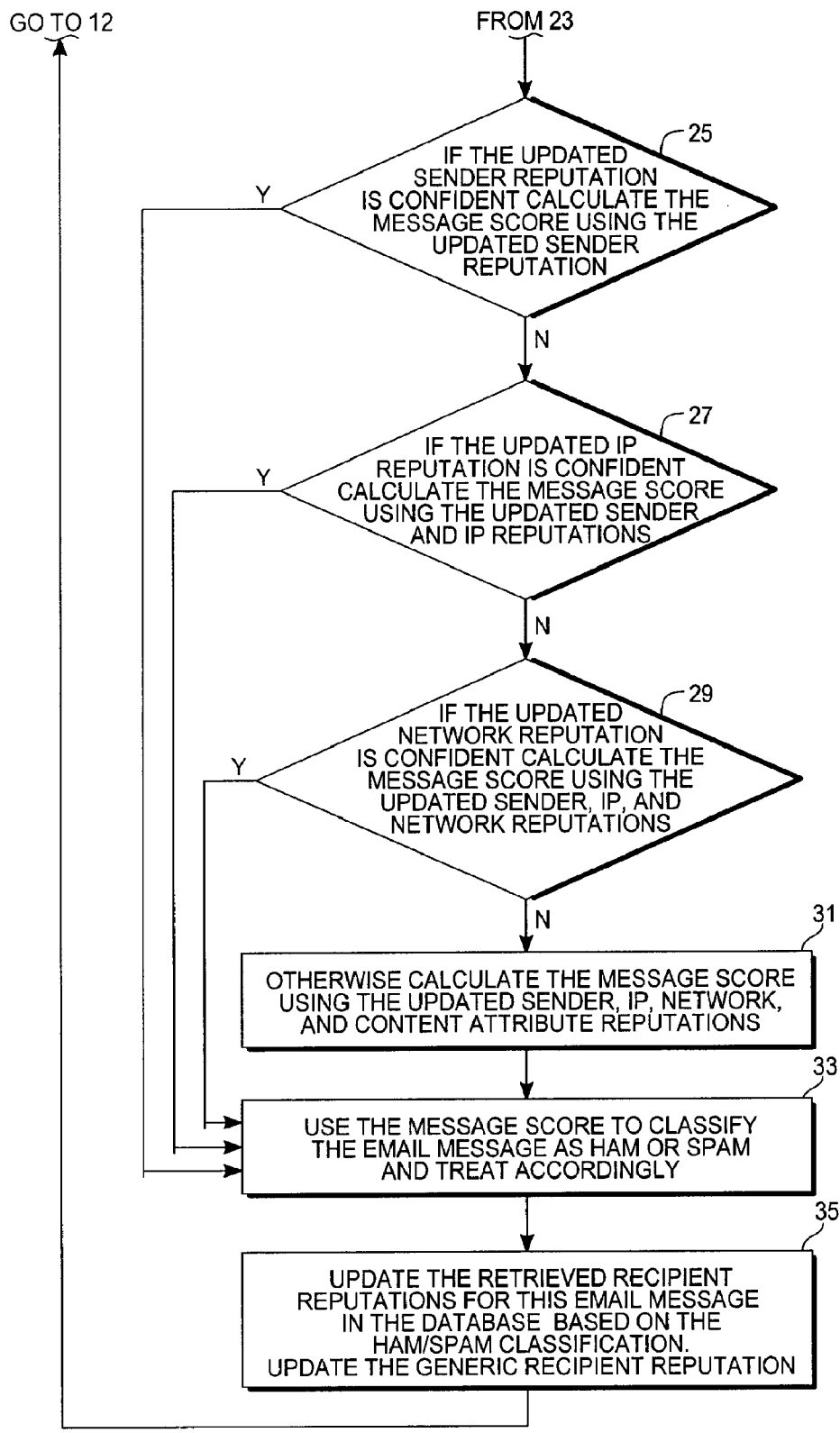

In the first embodiment with reference to FIGS. 1A and 1B, an email message enters an email system in block 11. This receipt of the email message begins the entire process comprising updating general statistics, reputations and determining whether the email message is spam. Information about the email message, found in the header and body, which is received in block 11 is recorded. This recorded information comprises the recipients of the email message, the sender's address, the IP address from which the email message was sent, the network address from which the email was sent and the content of the email message. The recorded information from the email message is then used in block 13 to retrieve historical statistics from the historical database in block 12, most notably the corresponding reputations; recipient, sender, IP, network and content. Recall that the historical is kept as a central statistics database.

Reputations for each unique individual recipient of the email message that were retrieved in block 13 from the historical database in block 12 are normalized in block 15. The ratio for each retrieved recipient reputation is normalized in block 15 by multiplying it by the inverse ratio of the generic recipient reputation. Once the recipient reputations are normalized in block 15, the message attribute reputations (sender reputation, IP reputation, network reputation) and content attribute reputations are processed for updating in blocks 17-23.

Sender reputation is updated in block 17. The sender reputation that was retrieved in block 13 from the historical database in block 12 is multiplied by the normalized recipient reputations in block 15 of the recipients for whom the email message is unsolicited. The updated value for the sender reputation is stored in the historical database in block 12. If the sender is new, there will not be a sender reputation stored in the historical database in block 12. The sender reputation may be initialized with a ratio of 1:1 or with the IP reputation of the IP address from which the sender has sent the email message.

IP reputation is updated in block 19. The IP reputation that was retrieved in block 13 from the historical database in block 12 is updated by the results of the sender reputation update in block 17. Recall that IP reputation is the ratio of the number of unique good to bad senders using this IP address. If the updated sender reputation in block 17 has changed state, e.g., changed from good to bad, bad to good, unknown to good, unknown to bad, or if this is a new IP address, the number of unique good or unique bad senders using this IP address has changed and the IP reputation changes accordingly. The updated value for the IP reputation in block 19 is stored in the historical database in block 12.

Network reputation is updated in block 21. The network reputation that was retrieved in block 13 from the historical database in block 12 is updated by the results of the IP reputation update in block 19. Recall that network reputation is the ratio of the number of unique good to bad IP addresses within this network sending unsolicited email messages. If the updated IP reputation in block 19 has changed state, e.g., changed from good to bad or bad to good or unknown to good or unknown to bad, it changes the number of unique good or unique bad IP addresses within this network sending unsolicited email messages and the network reputation changes accordingly. The updated value for the network reputation in block 21 is stored in the historical database in block 12.

Content reputations for each content attribute and the generic content attribute are updated in block 23. Recall that content attributes are defined as individual content elements comprising the email message such as URLs, body text hashes, words, phrases, and so on and that the generic content attribute is a content attribute assumed to be present in every email message. Content attribute reputations are only updated when the IP reputation is either indeterminate (not purely ham or purely spam or not yet determined). For each content attribute reputation and the generic content attribute reputation, we add the number of good normalized unsolicited recipients of the email message to the numerator, and the number of normalized bad unsolicited recipients of the email message to the denominator. For example, with an indeterminate IP reputation, if an unsolicited email message is sent to five recipients and there are three normalized good recipients and two normalized bad recipients, we add three (3) to the numerator of every content attribute reputation and two (2) to the denominator of every content attribute reputation for this email message including the generic content attribute reputation. Therefore, the content attribute reputations, when normalized against the generic content attribute reputation, reflect the likelihood that the content attribute is likely to be ham or spam for email messages sent to unsolicited recipients from indeterminate IP addresses. The updated values for the content attribute reputations in block 23 are stored in the historical database in block 12. Once the message and content attribute reputations have been updated in blocks 17-23 and stored in the historical database in block 12, the hierarchal calculation of the message score takes place in blocks 25-31.

Recall that confidence levels are based upon the number of samples used to determine a reputation or the value of the reputation. The confidence level for the sender reputation is tested in block 25. If the confidence level for the sender reputation that was updated in block 17 is sufficiently high the message score is calculated using the updated sender reputation from block 17. The message score is equal to the updated sender reputation, and the email message is classified as ham or spam in block 33. Otherwise test the IP reputation in block 27.

The confidence level for the IP reputation is tested in block 27. If the confidence level for the IP reputation that was updated in block 19 is sufficiently high the message score is calculated using the sender reputation that was updated in block 17 and the IP reputation that was updated in block 19. The message score is the geometric mean of the sender and IP reputations which is equal to the square root of [(sender reputation)*(IP reputation)], and the email message is classified as ham or spam in block 33. Otherwise test the network reputation in block 29.

The confidence level for the network reputation is tested in block 29. If the confidence level for the network reputation that was updated in block 21 is sufficiently high the message score is calculated using the geometric mean of the sender reputation that was updated in block 17, the IP reputation that was updated in block 19 and the network reputation that was updated in block 21. The message score is the cube root of [(sender reputation)*(IP reputation)*(network reputation)], and the email message is classified as ham or spam in block 33. Otherwise calculate the message score using all four attribute reputations in block 31.

Confidence testing is not done in block 31. The message score is calculated using all four attribute reputations, the sender reputation that was updated in block 17, the IP reputation that was updated in block 19, the network reputation that was updated in block 21 and the best good content attribute reputation that was updated in block 23 and the worst bad content attribute reputation that was updated in block 23. Each content attribute reputation is normalized by multiplying it by the inverse of the generic content attribute. The message score is the cube root of [(sender reputation)*(IP reputation)*(network reputation)] multiplied by [(best good normalized content attribute reputation)*(worst bad normalized content attribute reputation)].

The calculated message score is used in block 33 to classify the email message as ham or spam. The message score is a ham to spam odds ratio of the email message, e.g., a 5:5 odds ratio is a score of one (1) which means the email message is equally likely to be ham or spam. A message score greater than one is a good score indicating the email message is ham. A message score less than one is a bad score indicting the email message is spam. Message score values close to one are indeterminate. A range that is close to one, such as between 0.75 and 1.25, can be designated as an indeterminate range. This indeterminate range means a message score greater than 1.25 is a good score, a message score less than 0.75 is a bad score and a message score between 0.75 and 1.25 is an indeterminate score indicating the email message cannot be easily classified. When the email message has been rated as ham, spam or indeterminate, the email system that received the email message in block 11 processes the email message as is appropriate.

The recipient reputations of the unsolicited recipients of the email message and the generic recipient reputation are updated in block 35. These reputations which were retrieved in block 13 from the historical database in block 12 are updated. Recall that recipient reputation is defined as the ratio of ham to spam unsolicited email messages received by that recipient. The recipient reputations of the unsolicited recipients have their ham count incremented if the email message is a clear ham, or their spam count incremented if the email message is a clear spam. If the email message is indeterminate, no changes are made. The generic recipient reputation is updated in exactly the same manner by assuming that the email message was also addressed to the generic recipient. The updated values for the recipient and generic reputations in block 35 are stored in the historical database in block 12.

Figure 2:
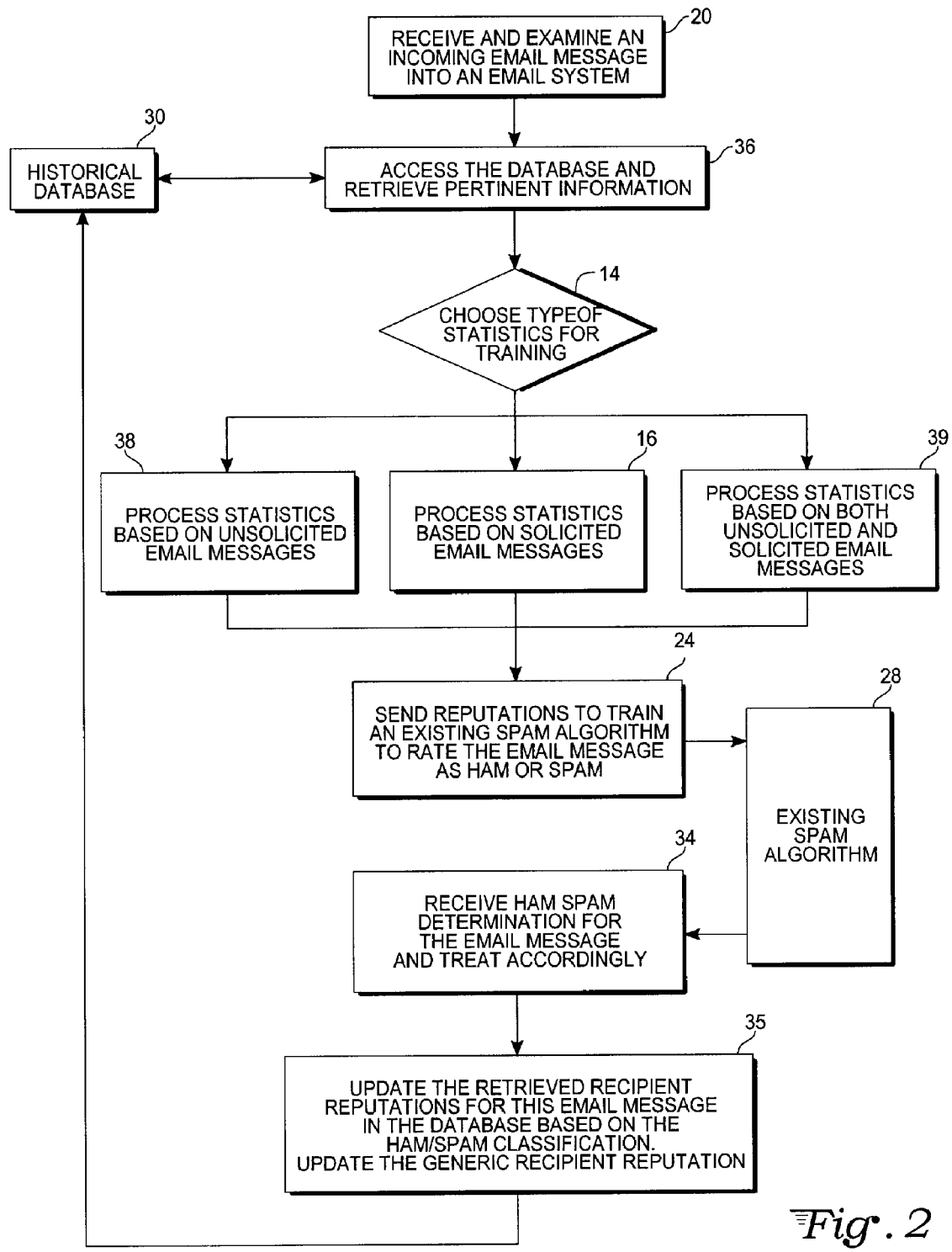
FIG. 2 is a flow chart of an alternate embodiment of the method illustrated in FIG. 1.

In the alternate embodiment of FIG. 2, an email message enters an email system in block 20. This receipt of the email message begins the entire process comprising recording pertinent information about the email message, updating general statistics, training an existing spam algorithm, receiving a determination of whether the email message is spam, using the spam determination to update recipient reputations and storing the updated recipient reputations in the historical database.

Information about the received email message in block 20, found in the header is recorded. This recorded information comprises the recipients and the sender of the email message. The recorded information from the email message is then used in block 36 to retrieve historical statistics from the historical database in block 30. The most notable retrieved pieces of information are the recipient reputations of the recipients of the email message, the recipient reputation of the generic recipient and the type of statistics (unsolicited, solicited or both) that are required for training the existing spam algorithm.

A path is chosen in block 14 for the type of statistics to be used which information was retrieved in block 36 from the historical database in block 30.

When the use of unsolicited statistics is chosen in block 14, reputations based on unsolicited statistics for the unsolicited recipients of the email message that were retrieved in block 36 from the historical database in block 30 are normalized in block 38. Normalization is done by multiplying the ratio for each retrieved recipient reputation by the inverse ratio of the generic recipient reputation.

When the use of solicited statistics is chosen in block 14, reputations, based on solicited statistics for the solicited recipients of the email message that were retrieved in block 36 from the historical database in block 30 are used in block 16. For solicited statistics, the recipient reputations are not normalized. Recall that for recipient reputations using solicited statistics there is a recipient reputation for each unique recipient-sender combination.

When the use of both unsolicited and solicited statistics is chosen in block 14, the reputations are processed in block 39 and handled as described in the above two paragraphs as in blocks 16 and 38.

The appropriate recipient reputations for the recipients of the email message in blocks 16, 38 or 39 are sent in block 24 to the existing spam algorithm in block 28. The existing spam algorithm in block 28 is trained using the recipient reputations it was sent in block 24 and determines if the email message is ham or spam. The ham or spam determination made by the existing spam algorithm in block 28 is received in block 34 and the email system that received the email message in block 20 processes the email message as is appropriate.

The recipient reputations of the recipients of the email message and the generic recipient reputation are updated in block 35. Recipient reputations for each recipient of the email message are updated appropriately. Unsolicited recipients have their unsolicited reputations updated and solicited recipients have their solicited recipient—sender reputations updated. For example, assume one of the recipients is recipient A, the sender is sender S and the email message was rated as good. If the email message for recipient A was unsolicited then the numerator of the unsolicited recipient reputation for recipient A is increased by one (1). If the email message for recipient A was solicited then the numerator of the solicited recipient reputation for the recipient A—sender S combination is increased by one (1). If the email message was unsolicited with respect to the generic recipient, then the numerator of the generic recipient reputation would be increased by one (1). The updated recipient reputations in block 35 are stored in the historical database in block 30.

EXAMPLE

The following example illustrates the method of the first embodiment of the present invention with reference to FIGS. 1A and 1B. A sender, sender@spam.com, sends an email message to recipient A and recipient B. Both recipients are on the same email system in block 11. The sender sends an email message from IP address 1.2.3.4. The email message is sent to recipient_a@recipient_company.com and recipient_b@recipient_company.com. The email message contains three content elements of interest. The email message is unsolicited with respect to each recipient. Neither recipient has received an email message from the sender or the IP address before. Neither recipient has previously received any of the content elements found in the email message. At least one other person in the email system in block 11 has received an email message from both the sender and the IP address meaning that the generic receiver has received an email message from both the sender and the IP address. The sender has only sent an email message to one other recipient in the email system in block 11 before. The information listed below in Table 1 already exists in a historical database in block 12.

TABLE 1

| Reputation Type | Specific Reputation | Reputation Ratio |
| --- | --- | --- |
| recipient | recipient_a@recipient_company.com | 2/5 |
| recipient | recipient_b@recipient_company.com | 3/10 |
| recipient | generic recipient | 1/5 |
| Sender | sender@spam.com | 1/1 |
| IP | 1.2.3.4 | 4/1 |
| Network | 1.2.3 | 7/2 |
| Content | URL - http://www.c.com/ | 1/2 |
| Content | Subject Line - "Important Message" | 2/5 |
| Content | Word - "text" | 2/40 |
| Content | generic content | 1000/5000 |

Recipient reputations are retrieved in block 13 from the historical database in block 12 for recipient A, recipient B and the generic recipient. The recipient reputations for recipients A and B are normalized in block 15, they are multiplied by the inverse of the generic reputation. The equation for recipient A is $(2/5)*(5/1)=2/1$ and the equation for recipient B is $(3/10)*(5/1)=3/2$.

Sender reputation of 1/1, which has a value of one (1), was retrieved in block 13 from the historical database in block 12. A value of one (1) is a neutral indeterminate value so it is unknown whether the sender is a spammer. It has been assumed that the email message is unsolicited, so both recipients are used to update the sender reputation in block 17. The sender reputation, 1/1, is multiplied by the normalized recipient reputations in block 15 of both recipients A, 2/1, and B, 3/2, yielding the equation (sender reputation)*(normalized recipient reputation of recipient A)*(normalized recipient reputation of recipient B). Entering the values for the formula yields $(1/1)*(2/1)*(3/2)=3/1$. Before the email message was received in block 11 it was unknown if the sender was a spammer. The sender reputation, now 3/1, is greater than one (1) indicating the sender is not a spammer but a good sender. The sender reputation of 1/1 is updated to 3/1 in block 17 and stored in the historical database in block 12.

IP reputation that was retrieved in block 13 is readied for update in block 19. In this example, the sender reputation changed state from a neutral reputation of 1/1 to a good reputation of 3/1. There is now an additional good sender for this IP address so the IP reputation of 4/1 is updated to 5/1 in block 19 and stored in the historical database in block 12. The IP address remains good.

Network reputation that was retrieved in block 13 from the historical database in block 12 is readied for update in block 21. In this example, the network has a good reputation of 7/2. Although the IP reputation in block 19 increased from 4/1 to 5/1 and got better, this reflected an increase in the number of good senders, not IP addresses. There is no change in the number of good or bad IP addresses using this network (the IP reputation of this IP address remains good) so the network reputation remains unchanged. No change is made for the network reputation in block 21 and no change is made in the historical database in block 12.

The three content attribute reputations and the generic content attribute reputation that were retrieved in block 13 from the historical database in block 12 are readied for update in block 23. The IP address has a 5/1 reputation that is good. Assume that a 10/1 reputation or better is required to be considered a good IP address. Since the IP address has an indeterminate reputation under this assumption, the content attribute reputations should be updated. There are two recipients, both unsolicited who also have not previously received the content of this email. Both recipients, after normalization of their recipient reputations in block 15 are good recipients with recipient ratios of 2/1 and 3/2. Therefore the numerator, which is the number of good recipients receiving this content element, of each content attribute reputation as well as the generic content attribute reputation is updated by an increase of two in block 23. The URL content attribute reputation is increased from 1/2 to 3/2. The Subject Line content attribute reputation is increased from 2/5 to 4/5. The Word content attribute reputation is increased from 2/40 to 4/40. The generic content attribute reputation is increased from 1000/5000 to 1002/5000. These updated content attribute reputations in block 23 are stored into the historical database in block 12. Now that the reputations for the message and content attributes have been updated, the hierarchal method in blocks 25-31 is used to calculate the message score. The confidence level for the sender reputation is checked in block 25. It is too low because it is based on too few samples. The confidence level for the IP reputation is checked in block 27. It is too low because it is based on too few samples. The confidence level for the network reputation is checked in block 29. It is too low because it is based on too few samples.

Message score is calculated in block 31 using the updated reputations in blocks 17-23 of all three message attributes reputations and the appropriate content attribute reputations are used in the general equation, cube root of [(sender reputation)*(IP reputation)*(network reputation)] multiplied by [(best good normalized content attribute reputation)*(worst bad normalized content attribute reputation)]. Sender reputation was updated in block 17 and is 3/1. IP reputation was updated in block 19 and is 5/1. Network reputation was not updated in block 21 and remains 7/2. Content attribute reputations are normalized to determine which comprise the best good and the worst bad reputation. The normalizing factor, the inverse of the updated generic content attribute reputation is 5000/1002. The updated URL content attribute reputation of 3/2 is normalized by this equation 3/2*5000/1002=15/2. The updated subject line content attribute reputation of 4/5 is normalized by this equation 4/5*5000/1002=4/1. The updated word content attribute reputation of 4/40 is normalized by this equation 4/40*5000/1002=1/2. The best good normalized content attribute reputation is 15/2 for the URL element. The worst bad normalized content attribute reputation is 1/2 for the word element. Entering the reputations into the equation in block 31 yields:

$$\text{Message Score} = (3/1 * 5/1 * 7/2)^{1/3} (15/2)(1/2)$$
$$\text{Message Score} = 14.04$$

The message score of 14.04 is greater than one.

The email message is rated as a good email message in block 33 and the email system in block 11 treat the email message accordingly.

Reputations for the recipients and the generic recipient are updated in block 35. The new good unsolicited email message increases the numerator of each unsolicited recipient reputation by one. The recipient reputation for recipient A updates from 2/5 to 3/5 and is stored in the historical database in block 12. Recipient reputation for recipient B updates from 3/10 to 4/10 and is stored in the historical database in block 12. The generic recipient has received a prior email message from this sender; we know that because the sender reputation already exists. Since the email message is solicited with respect to the generic recipient (the generic recipient has previously received an email message from this sender), there is no change made in block 35 for the generic recipient reputation and no change is made in the historical database in block 12.

The following example illustrates the method of an alternate embodiment of the present invention with reference to FIG. 2. A sender, sender S, sends an email message to recipient A, recipient B and recipient C. All three recipients are on the same email system in block 20. The email message is sent to recipient_a@recipient_company.com, recipient_b@recipient_company.com and recipient_c@recipient company.com. The email message is unsolicited with respect to recipients A and B and solicited with respect to recipient C. Neither recipient A nor B has received an email message from sender S before. Recipient C has received an email message from sender S before meaning that the generic receiver has also received an email message from sender S. The information listed below in Table 2 already exists in the historical database in block 30.

TABLE 2

| Solicited Or Unsolicited | Recipient | Reputation Ratio |
| --- | --- | --- |
| unsolicited | recipient_a@recipient_company.com | 2/5 |
| solicited from sender S | recipient_a@recipient_company.com | 2/1 |
| unsolicited | recipient_b@recipient_company.com | 3/10 |
| solicited from sender S | recipient_b@recipient_company.com | 2/2 |
| unsolicited | recipient_c@recipient_company.com | 3/5 |
| solicited from sender S | recipient_c@recipient_company.com | 3/1 |
| unsolicited | generic recipient | 1/5 |

When unsolicited statistics are chosen in block 14, recipient reputations based on unsolicited statistics for the unsolicited recipients, A and B, which were retrieved in block 36 from the historical database in block 30 are used. These recipient reputations are normalized in block 38 by the inverse of the generic recipient reputation. The equation for recipient A is (2/5)*(5/1)=2/1 and the equation for recipient B is (3/10)*(5/1)=3/2. Since the email message is unsolicited for both recipients, both normalized reputations are sent in block 24 to the existing spam algorithm in block 28. The existing spam algorithm in block 28 is trained with these two normalized recipient reputations and since both reputations are greater than one (1) it is assumed that the email message will be determined to be a good ham email message.

The email system in block 20 receives this ham determination in block 34 and treats the email message accordingly.

Reputations for the recipients A, B, C and the generic recipient are updated in block 35. The email message has been determined to be good and will increase the numerators of appropriate recipient reputations. Unsolicited recipients have their unsolicited reputations updated and solicited recipients have their solicited recipient—sender S reputations updated. The unsolicited recipient reputation for recipient A updates from 2/5 to 3/5 in block 35 and is stored in the historical database in block 30. The unsolicited recipient reputation for recipient B updates from 3/10 to 4/10 in block 35 and is stored in the historical database in block 30. The generic recipient has received a prior email message from this sender S. Since the email message is solicited with respect to the generic recipient (the generic recipient has previously received an email message from this sender), there is no change made in block 35 for the generic recipient reputation and there is no change made in the historical database in block 30. The solicited recipient, recipient C, has now received a good solicited email message from sender S. The numerator of the solicited recipient reputation for the recipient C—sender S combination is increased by one (1). The solicited reputation for the recipient C—sender S combination updates from 3/1 to 4/1 in block 35 and is stored in the historical database in block 30.

When solicited statistics are chosen in block 14, recipient reputations based on solicited statistics for the appropriate unique recipient—sender combinations are used. Recipient C is the only solicited recipient for the email message so the solicited recipient reputation for the recipient C—sender S combination is retrieved in block 36 from the historical database in block 30 and used n block 16. Recall that solicited recipient reputations are not normalized. This reputation is forwarded in block 16 to be sent in block 24 to the existing spam algorithm in block 28. The existing spam algorithm in block 28 is trained with this reputation and since the reputation is greater than one (1) it is assumed that the email message will be rated as a good ham email message.

The email system in block 20 receives this ham determination in block 34 and treat the email message accordingly.

Reputations for the recipients A, B, C and the generic recipient are updated in block 35. The email message has been determined to be good and will increase the numerators of appropriate recipient reputations. Unsolicited recipients have their unsolicited reputations updated and solicited recipients have their solicited recipient—sender S reputations updated. The unsolicited recipient reputation for recipient A updates from 2/5 to 3/5 in block 35 and is stored in the historical database in block 30. The unsolicited recipient reputation for recipient B updates from 3/10 to 4/10 in block 35 and is stored in the historical database in block 30. The generic recipient has received a prior email message from this sender S. Since the email message is solicited with respect to the generic recipient (the generic recipient has previously received an email message from this sender), there is no change made in block 35 for the generic recipient reputation and there is no change made in the historical database in block 30. The solicited recipient, recipient C, has now received a good solicited email message from sender S. The numerator of the solicited recipient reputation for the recipient C—sender S combination is increased by one (1). The solicited reputation for the recipient C—sender S combination updates from 3/1 to 4/1 in block 35 and is stored in the historical database in block 30.

When both unsolicited statistics and solicited statistics are chosen in block 14 processing occurs in block 39. Recipient reputations based on unsolicited statistics for the unsolicited recipients are processed in block 39 as described above as in block 38. Recipient reputations based on solicited statistics for the solicited recipients are processed in block 39 as described above as in block 16. The recipient reputations are then sent in block 24 to the existing spam algorithm in block 28. The existing spam algorithm in block 28 is trained with the reputations and rates the email message as described above.

The email system in block 20 receives this rating for the email message in block 34 and treats the email message accordingly as described above.

The updating of the recipient reputations proceeds as previously described in block 35 and the updates are stored as previously described in the historical database in block 30.

What is claimed is:

1. A method for determining whether an incoming email message entering an email system with a plurality of recipients addressed to one or more of the recipients is ham or spam comprising:

accumulating counts of unsolicited ham email messages and unsolicited spam email messages received by each recipient;

calculating recipient reputations for recipients of email messages using the accumulated counts;

calculating a sender reputation for a sender of an email message by combining the recipient reputations of the recipients associated with the sender;

calculating a message score for the email message using the calculations; and updating the accumulated counts using the message score.

2. The method of claim 1 further comprising wherein the recipient reputations are likelihood ratios calculated from a ratio of the unsolicited ham email messages to the unsolicited spam email messages received by each recipient.

3. The method of claim 1 further comprising calculating the message score using the sender reputation.

4. The method of claim 1 further comprising calculating an IP reputation for an IP address using a ratio of good to bad senders sending email messages from the IP address.

5. The method of claim 4 further comprising calculating the message score using the IP reputation.

6. The method of claim 4 further comprising calculating the message score for the email message using the sender reputation and the IP reputation.

7. The method of claim 1 further comprising storing sender reputations and IP reputations at a central network location.

\* \* \* \* \*